(12) United States Patent
Kumazawa

(10) Patent No.: US 8,625,137 B2
(45) Date of Patent: Jan. 7, 2014

(54) JOB EXECUTION MANAGEMENT APPARATUS, JOB EXECUTION APPARATUS, JOB EXECUTION SYSTEM AND COMPUTER-READABLE MEDIUM

(75) Inventor: Yukio Kumazawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 404 days.

(21) Appl. No.: 13/116,153

(22) Filed: May 26, 2011

(65) Prior Publication Data

US 2012/0092704 A1 Apr. 19, 2012

(30) Foreign Application Priority Data

Oct. 13, 2010 (JP) ................................. 2010-230411

(51) Int. Cl.
*G06F 15/16* (2006.01)

(52) U.S. Cl.
USPC .......................................... 358/1.15; 709/201

(58) Field of Classification Search
None
See application file for complete search history.

(56) References Cited

U.S. PATENT DOCUMENTS

2006/0215185 A1* 9/2006 Van Den Tillaart ............ 358/1.1

FOREIGN PATENT DOCUMENTS

| JP | 2005-352699 A | 12/2005 |
|---|---|---|
| JP | 2006-252131 A | 9/2006 |

* cited by examiner

*Primary Examiner* — Twyler Haskins
*Assistant Examiner* — Lennin RodriguezGonzalez
(74) *Attorney, Agent, or Firm* — Sughrue Mion, PLLC

(57) ABSTRACT

A job execution apparatus includes a partial job allocation processing section and a partial job execution instruction section. The partial job allocation processing section allocates each partial job formed by segmenting a received job to a data processing apparatus capable of executing the partial job. The partial job execution instruction section instructs the data processing apparatus to execute the partial job. The partial job allocation processing section reallocates a partial job, which execution was not completed by the data processing apparatus to which the partial job is allocated until a preset end time, to a data processing apparatus capable of executing the unfinished partial job, other than the data processing apparatus to which the unfinished partial job is allocated. The partial job execution instruction section transmits an instruction for executing the unfinished partial job to the reallocated data processing apparatus.

8 Claims, 12 Drawing Sheets

FIG. 5

APPARATUS FUNCTION INFORMATION

| APPARATUS ID | LOCATION | EXECUTABLE FUNCTIONS | SPECIALTY FUNCTION |
|---|---|---|---|
| P 0 | http://1.2.3.0 | A, B, C | — |
| P 1 | http://1.2.3.1 | A, B, C, D, E | A |
| P 2 | http://1.2.3.2 | A, B, C, E, F, G | C |
| P 3 | http://1.2.3.3 | A, B, C, D, F, H | E |
| ⋮ | | | |
| P n | http://1.2.3.255 | A, B, C, D, E, F, G | G |

FIG. 6

ALLOCATION INFORMATION

| PARTIAL JOB ID | EXECUTION INSTRUCTION DESTINATION | REQUESTED FUNCTION | START TIME | END TIME | STATUS |
|---|---|---|---|---|---|
| J 1 | http://1.2.3.3 | C | 10:00:00 | 10:05:00 | NORMAL END |
| J 2 | http://1.2.3.1 | A | 10:00:30 | 10:05:30 | NORMAL END |
| J 3 | http://1.2.3.2 | F | 10:02:15 | 10:10:00 | UNFINISHED |
| J 4 | http://1.2.3.8 | H | 10:02:45 | 10:15:00 | UNDER PROCESSING |
| J 5 | http://1.2.3.5 | G | 10:11:00 | 10:19:15 | UNDER PROCESSING |

FIG. 11

ALLOCATION INFORMATION

| JOB ID | REQUESTED FUNCTION | APPARATUS ID | EXECUTION INSTRUCTION DESTINATION | START TIME | END TIME | STATUS |
|---|---|---|---|---|---|---|
| J x | F1 | Pb | http://1.2.3.11 | 10:00:00 | 10:05:00 | NORMAL END |
| J y | F2 | Pa | http://1.2.3.18 | 10:00:30 | 10:05:30 | NORMAL END |
|  |  | Pd | http://1.2.3.24 | 10:02:15 | 10:10:00 | UNFINISHED |
| J z | F3 | Pf | http://1.2.3.51 | 10:11:00 | 10:19:15 | UNDER PROCESSING |

JOB EXECUTION MANAGEMENT APPARATUS, JOB EXECUTION APPARATUS, JOB EXECUTION SYSTEM AND COMPUTER-READABLE MEDIUM

CROSS-REFERENCE TO RELATED APPLICATION

This application is based on and claims priority under 35 USC 119 from Japanese Patent Application No. 2010-230411 filed on Oct. 13, 2010.

BACKGROUND

Technical Field

The present invention relates to a job execution management apparatus, a job execution apparatus, a job execution system and a computer-readable medium.

SUMMARY

According to an aspect of the invention, a job execution management apparatus includes a receiving unit, a storage unit, an allocation unit, a setting unit, an execution instruction unit and a reallocation unit. The receiving unit receives an allocation request for allocating a plurality of partial jobs formed by segmenting a job to a plurality of data processing apparatuses. The storage unit stores apparatus function information in which functions executable by the respective data processing apparatuses are defined. The allocation unit allocates the respective plurality of partial jobs to the data processing apparatuses which are capable of executing the plurality of partial jobs by referring to the apparatus function information according to the allocation request. The setting unit sets so that, when a partial job is allocated to one of the data processing apparatuses, information for specifying the data processing apparatus allocated to the partial job, start time information for specifying the time when the execution of the partial job is started and end time information for specifying the end time of the execution of the partial job are made correspondence with the partial job. The execution instruction unit instructs the execution of a partial job to the corresponding data processing apparatus according to the setting of the setting unit. The reallocation unit, after the instruction from the execution instruction unit, (i) specifies partial jobs among the partial jobs which are instructed to be executed, the execution of the specified partial jobs being not finished until the times specified by the end time information corresponding to the partial jobs, and (ii) reallocates at least one of the data processing apparatuses which is capable of executing the unfinished partial jobs, excluding the data processing apparatuses to which the unfinished partial jobs are allocated by the allocation unit, to each of the specified unfinished partial jobs by referring to the apparatus function information. The execution instruction unit instructs the data processing apparatuses reallocated by the reallocation unit to execute the unfinished partial jobs.

BRIEF DESCRIPTION OF THE DRAWINGS

Exemplary embodiments of the invention will be described in detail based on the following figures, wherein:

FIG. 5 is a view showing an example of the data configuration of apparatus function information stored in an apparatus function information storage section according to Embodiment 1;

FIG. 6 is a view showing an example of the data structure of allocation information stored in an allocation information storage section according to Embodiment 1;

FIG. 11 is a view showing an example of the data configuration of allocation information stored in the allocation information storage section after the reallocation processing was performed in Embodiment 1.

DETAILED DESCRIPTION

Preferable embodiments according to the present invention will be described below on the basis of the accompanying drawings.

In the following descriptions, the term "job" is defined as an executable unit of processing that uses a function provided by some sort of information processing performed using software and hardware, for example, processing executed using a copying function, a printing function, a facsimile transmission function, etc. in a multifunctional copier. This kind of function is sometimes referred to as "service" or "task."

Figure 1:
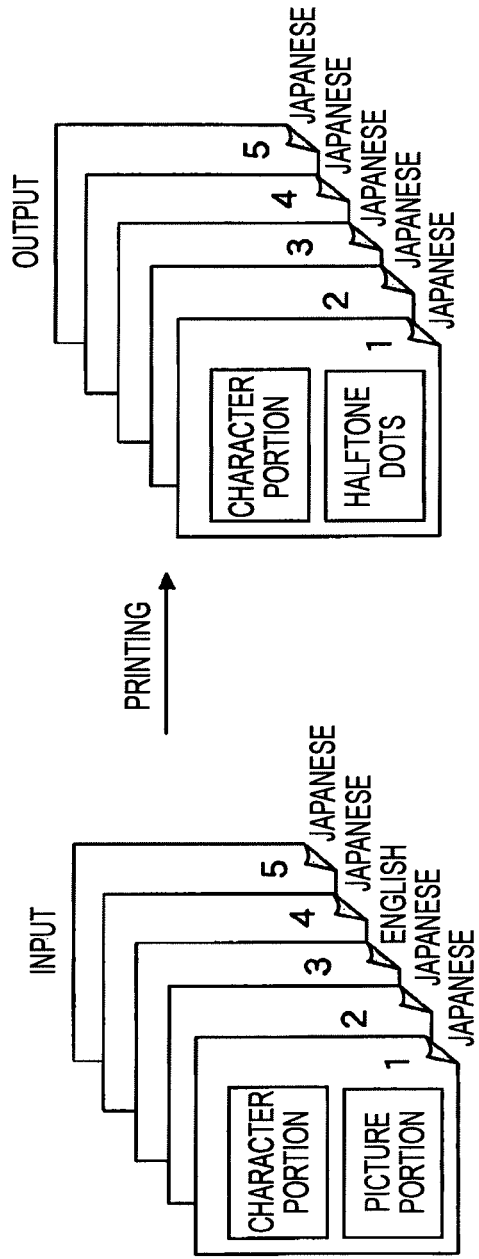
FIG. 1 is a view illustrating the relationship between a "job" and a "partial job" according to an embodiment of the present invention.

FIG. 1 is a view illustrating the relationship between a "job" and a "partial job." The job shown in FIG. 1 is a job for printing a five-page document in particular. Each page on which a character portion and a picture portion are mixedly disposed is generally represented in a page-description language (PDL). FIG. 1 shows that the character portions on pages 1, 2, 4 and 5 of the five-page document are written in Japanese and that the character portion on page 3 is written in English. In the case that the term "job" is simply used, the job is defined as a series of processing in which five-page document data represented in the PDL is converted into image data through the interpretation of the PDL representing each page and the image data is visualized and fixed on recording paper using a printer, such as an ink-jet printer. Partial jobs are formed by segmenting a job into a plurality of portions. Processing in which the term "partial job" is used is defined as processing relating to a portion of the "job," that is, processing in which any one of the five pages is printed or processing in which the character portion and the picture portion constituting a given page are processed separately, for example, processing in which the picture portion is converted so that halftone dots suited to represent halftone for an output printer are obtained or processing in which page 3 containing a character portion written in English is translated into Japanese and printed.

Embodiment 1

Figure 2:
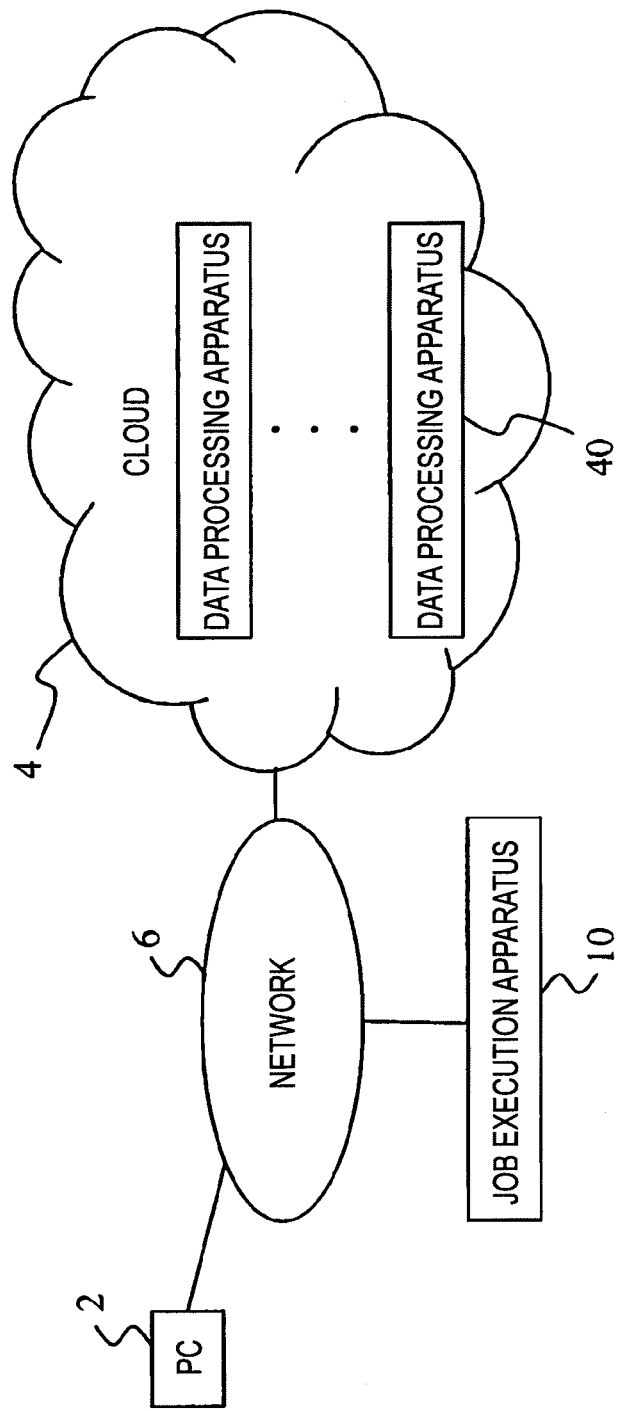
FIG. 2 is an overall configuration drawing showing an embodiment of a job execution system according to the present invention.

FIG. 2 is an overall configuration drawing showing an embodiment of a job execution system according to the present invention. FIG. 2 shows a configuration in which a personal computer (PC) 2, a job execution apparatus 10 and a cloud 4 are connected to a network 6. The job execution apparatus 10 according to this embodiment executes a job or part thereof in response to a request from the PC 2. The cloud 4 is an abbreviation of cloud computing and has a plurality of data processing apparatuses 40. Each of the data processing apparatuses 40 has one or more service processing functions. Jobs handled in this embodiment are executed by a combination of one or more service processing functions, such as character/picture separation, OCR and translation. The data processing apparatus 40 executes one or more service processing operations according to instructions from the job execution apparatus 10 having received the job. Although one PC 2 and one job execution apparatus 10 are shown in FIG. 2, the number of each of the apparatuses is not limited to one.

Figure 3:
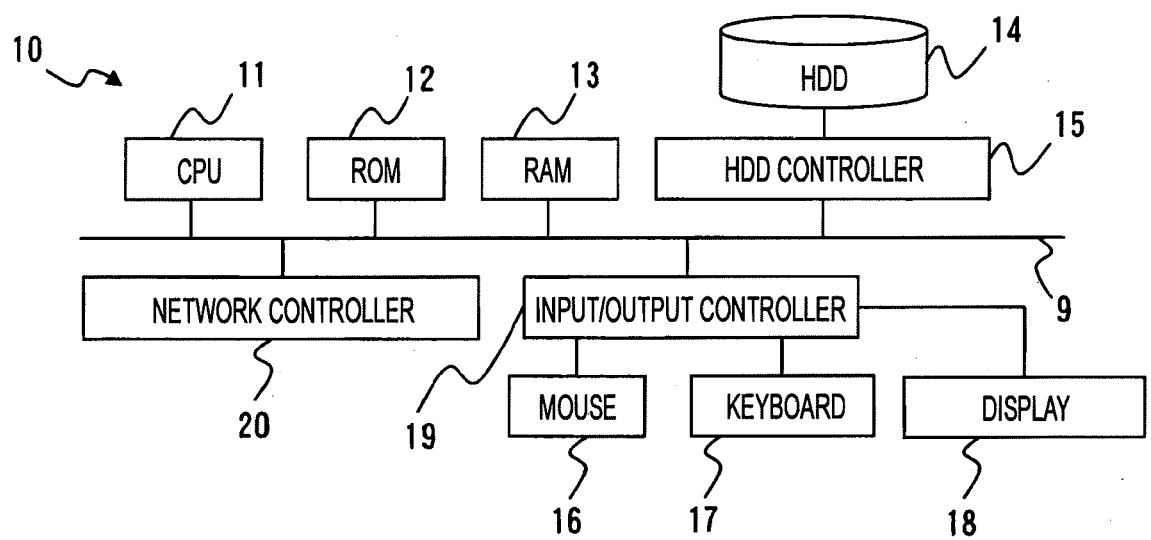
FIG. 3 is a view showing a hardware configuration of a computer constituting the job execution apparatus according to Embodiment 1.

FIG. 3 is a view showing a hardware configuration of a computer constituting the job execution apparatus 10 according to this embodiment. The computer according to this embodiment can be accomplished using a conventional general-purpose hardware configuration. More specifically, as shown in FIG. 3, the computer has a CPU 11, a ROM 12, a RAM 13, an HDD controller 15 to which a hard disk drive (HDD) 14 for storing, for example, software for accomplishing the service processing functions is connected, an input/output controller 19 to which a mouse 16 and a keyboard 17 provided as input means and a display 18 provided as a display device are connected, and a network controller 20 provided as communication means, these being connected to an internal bus 9. In addition to these, a scanner, a printer, etc. may also be connected to form the configuration. Alternatively, the job execution apparatus 10 may be formed of an image forming apparatus having a plurality of functions, such as a scanner function and a printing function. The computer having the above-mentioned configuration is mounted on the image forming apparatus. Furthermore, an operation panel, a scanner, a printer, etc. are also mounted.

The data processing apparatus 40 may be accomplished using a conventional general-purpose computer hardware configuration. In other words, the data processing apparatus 40 may be formed of the computer having the hardware configuration shown in FIG. 3.

Figure 4:
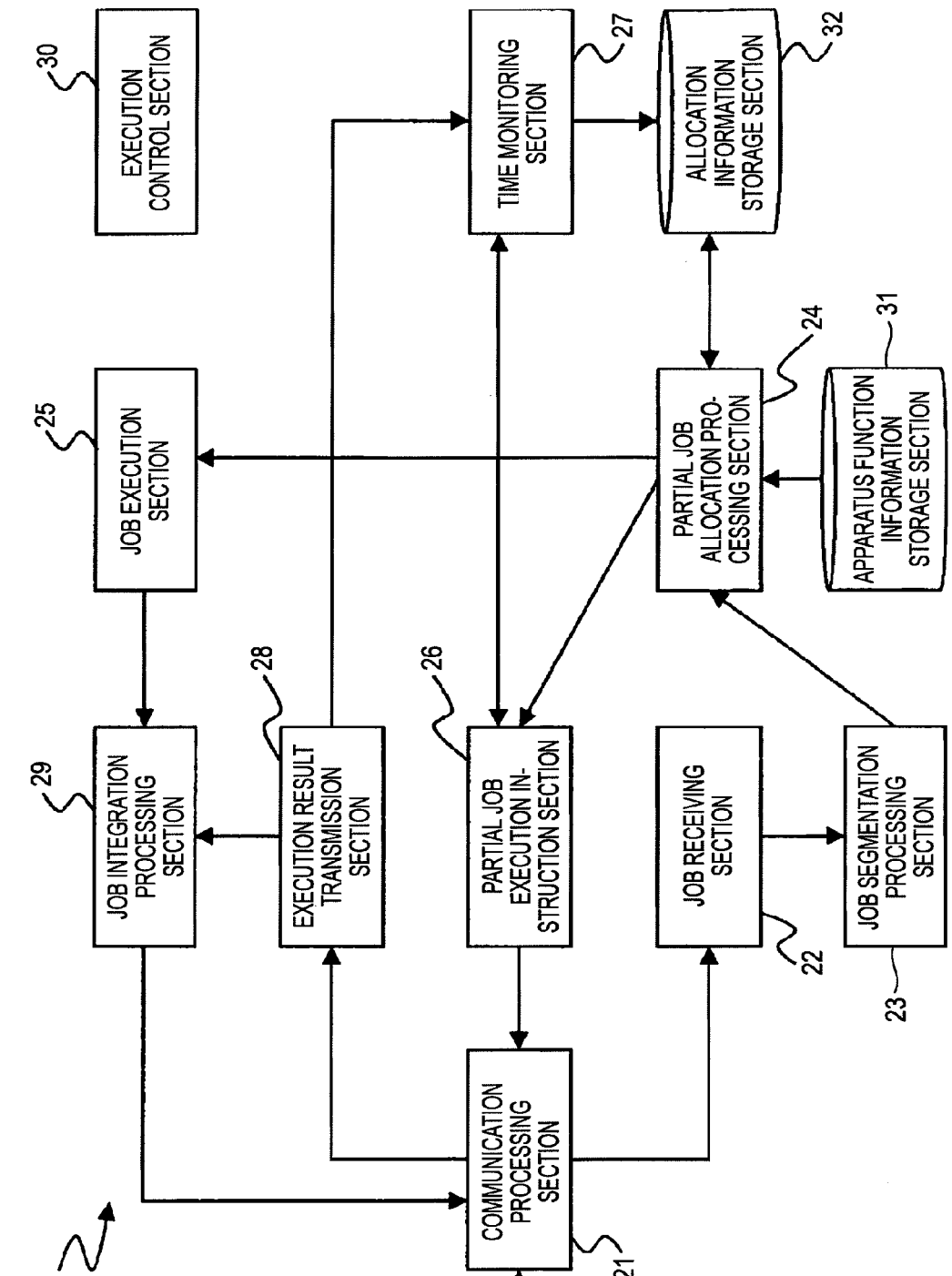
FIG. 4 is a block configuration diagram showing the job execution apparatus according to Embodiment 1.

FIG. 4 is a block configuration diagram showing the job execution apparatus 10 according to this embodiment. The job execution apparatus 10 according to this embodiment has a communication processing section 21, a job receiving section 22, a job segmentation processing section 23, a partial job allocation processing section 24, a job execution section 25, a partial job execution instruction section 26, a time monitoring section 27, an execution result receiving section 28, a job integration processing section 29, an execution control section 30, an apparatus function information storage section 31, and an allocation information storage section 32. The communication processing section 21 performs communication with the PC 2 and the cloud 4 and distributes received data to the job receiving section 22 or the execution result receiving section 28 depending on the contents of the data. The job receiving section 22 receives a job execution request transmitted from the PC 2. In the case that the job execution apparatus 10 is formed of an image processing apparatus, jobs may also be received through the input from the operation panel. The job segmentation processing section 23 judges whether a job requested for execution should be segmented. In the case that the job segmentation processing section 23 judges that the job should be segmented, the section executes segmentation processing by segmenting the job into a plurality of partial jobs. The judgment as to whether the job should be segmented is made by examining whether a function that cannot be executed by the job execution apparatus 10 is required when the job is executed, for example, by examining whether a translation function, such as, a translation function between Japanese and English, for translating text data obtained by analyzing the PDL into another language is required. When a page requiring a function that cannot be executed by the job execution apparatus 10 is detected by the examination described above, the page is extracted and generated as a partial job. In this way, the job segmentation processing section 23 segments a job into a plurality of partial jobs. However, in the case that the job segmentation processing section 23 judges that it is not necessary to segment the job into partial jobs, the section does not perform the segmentation processing. The partial job allocation processing section 24 performs allocation processing for allocating the plurality of the generated partial jobs to the data processing apparatuses 40 capable of executing the partial jobs by referring to apparatus function information registered in the apparatus function information storage section 31. A partial job that can be executed by the job execution apparatus 10 may also be allocated to the job execution apparatus 10 as a matter of course. Furthermore, the partial job allocation processing section 24 executes reallocation processing for allocating a partial job not completed by the time specified according to end time information made correspondence with the partial job, to at least one of the data processing apparatuses 40 capable of executing the partial job. Furthermore, the partial job allocation processing section 24 sets, for example, information for specifying the data processing apparatus 40 to which each partial job is allocated, to the allocation information storage section 32. The job execution section 25 executes the received job or one or more partial jobs contained in the job. The partial job execution instruction section 26 transmits an execution instruction request to the data processing apparatus 40 to which the partial job is allocated, thereby instructing the data processing apparatus 40 to execute the partial job. The time monitoring section 27 monitors the execution status of the partial job of each data processing apparatus 40 according to the reception state of a message transmitted from each data processing apparatus 40 and the content of the message on the basis of allocation information being set in the allocation information storage section 32. Moreover, the time monitoring section 27 renews part of the information stored in the allocation information storage section 32. When the execution of the partial job by the data processing apparatus 40 is completed, the execution result receiving section 28 receives status information indicating the completion of the execution of the partial job and the result of the execution. The job integration processing section 29 generates the execution result of the job by integrating the execution results of the partial jobs received from the data processing apparatuses 40, or in the case that there is a partial job executed by the job execution apparatus 10 itself, the job integration processing section 29 generates the execution result of the job by also integrating the execution result of the partial job, and then return the execution result to the execution request source of the job. The execution control section 30 performs the execution control of the job in cooperation with the respective components 21 to 29. The apparatus function information storage section 31 and the allocation information storage section 32 will be described later.

The components 21 to 30 of the job execution apparatus 10 are accomplished by cooperation between the computer constituting the job execution apparatus 10 and programs operating on the CPU 11 mounted on the computer. Furthermore, the apparatus function information storage section 31 and the allocation information storage section 32 may be accomplished by the HDD 14.

Furthermore, programs to be used in this embodiment can be provided through the communication means as a matter of course and can also be provided as being stored in computer-readable recording media, such as CD-ROMs and DVD-ROMs. The programs provided by the communication means or recording media are installed in the computer, and the installed programs are executed sequentially by the CPU of the computer to execute various kinds of processing.

FIG. 5 is a view showing an example of the data configuration of the apparatus function information stored in the apparatus function information storage section 31 according to this embodiment. The apparatus function information is formed so that "location," "executable functions" and "specialty function" are made correspondence with "apparatus ID" being set as identification information for identifying each data processing apparatus 40. "Location" is information for specifying the location in which the data processing apparatus 40 exists, and in this embodiment, URL (uniform resource locator) is set. Information for specifying functions that can be executed by the data processing apparatus is set in "executable functions." Although A, B, C, etc. are described in FIG. 5, the executable functions are, for example, Japanese-English translation processing and structural analysis processing for analyzing headers, ruled line portions, etc. contained in document/image data. In "specialty function," a function in which the data processing apparatus specializes is selected from among "executable functions" and set. Examples of the specialty functions include a function that can be processed at high speed by incorporating a hardware accelerator and a special function that cannot be executed by the other data processing apparatuses owing to license restrictions, for example. In the case that a plurality of data processing apparatuses 40 to which the execution of one partial job is requested are detected, the indication of this kind of specialty function serves as a guide when selecting which data processing apparatus 40 should be requested preferentially for the execution of the partial job.

The job execution apparatus 10 itself can be used as an apparatus for executing a partial job as in the case of the data processing apparatus 40. Hence, it may also be possible that the job execution apparatus 10 manages information regarding functions mounted thereon and its specialty function using the apparatus function information storage section 31 as in the case of the data processing apparatus 40.

FIG. 6 is a view showing an example of the data structure of allocation information stored in the allocation information storage section 32 according to this embodiment. In the allocation information, "execution instruction destination," "requested function," "start time," "end time" and "status" are made correspondence with "partial job ID" that is set as identification information for identifying each partial job formed by job segmentation. In "execution instruction destination," information for specifying the data processing apparatus 40 to which the partial job is allocated is set as information for specifying the transmission destination of the partial job. In this embodiment, the URL that is set in the location corresponding to the data processing apparatus 40 is set by referring to the information stored in the apparatus function information storage section 31. However, information, such as apparatus ID, may also be used if the information can specify the data processing apparatus 40. In "requested function," information for specifying a function that is used to execute the partial job using the data processing apparatus 40 is set. In "start time," the time when the execution of the partial job is started is set. In this embodiment, "start time" to be set is not the time when the data processing apparatus 40 actually starts the execution of the partial job but the time when the partial job execution instruction section 26 issues an execution instruction to the data processing apparatus 40. Although the time of day is shown in FIG. 6 for convenience, information containing date, month and year may be added thereto. Furthermore, for example, in the case of a partial job that is executed using the execution result of the partial job executed immediately before, information indicating the elapsed time after the reception of the execution result of the partial job executed immediately before, instead of a specific time, may be set in "start time." The "end time" is the maximum waiting time required until the execution of the partial job is completed. In this embodiment, the waiting time until the execution result receiving section 28 receives the execution result of the partial job is set. Although the time of day is shown in FIG. 6 for convenience, information containing date, month and year may be added thereto. Furthermore, for example, the elapsed time from "start time," instead of a specific time, may also be set in "end time." "End time" is set to avoid a situation in which the execution of the job corresponding to the total of the partial jobs cannot be completed eventually because the execution result receiving section 28 keeps waiting for the result of the execution of the partial job requested to the data processing apparatus 40. In "status," information indicating the status of the partial job is set. In this embodiment, for example, any one of the following statuses is set: "before start" indicating a status obtained before the partial job execution instruction section 26 issues an execution instruction to the data processing apparatus 40, "under processing" indicating that the partial job is being executed since the partial job execution instruction section 26 has issued an execution instruction to the data processing apparatus 40, "normal end" indicating that it is confirmed that the execution of the partial job has been completed normally, and "unfinished" indicating that a normal end notice was not transmitted from the data processing apparatus 40 even when the end time was reached.

Figure 7:
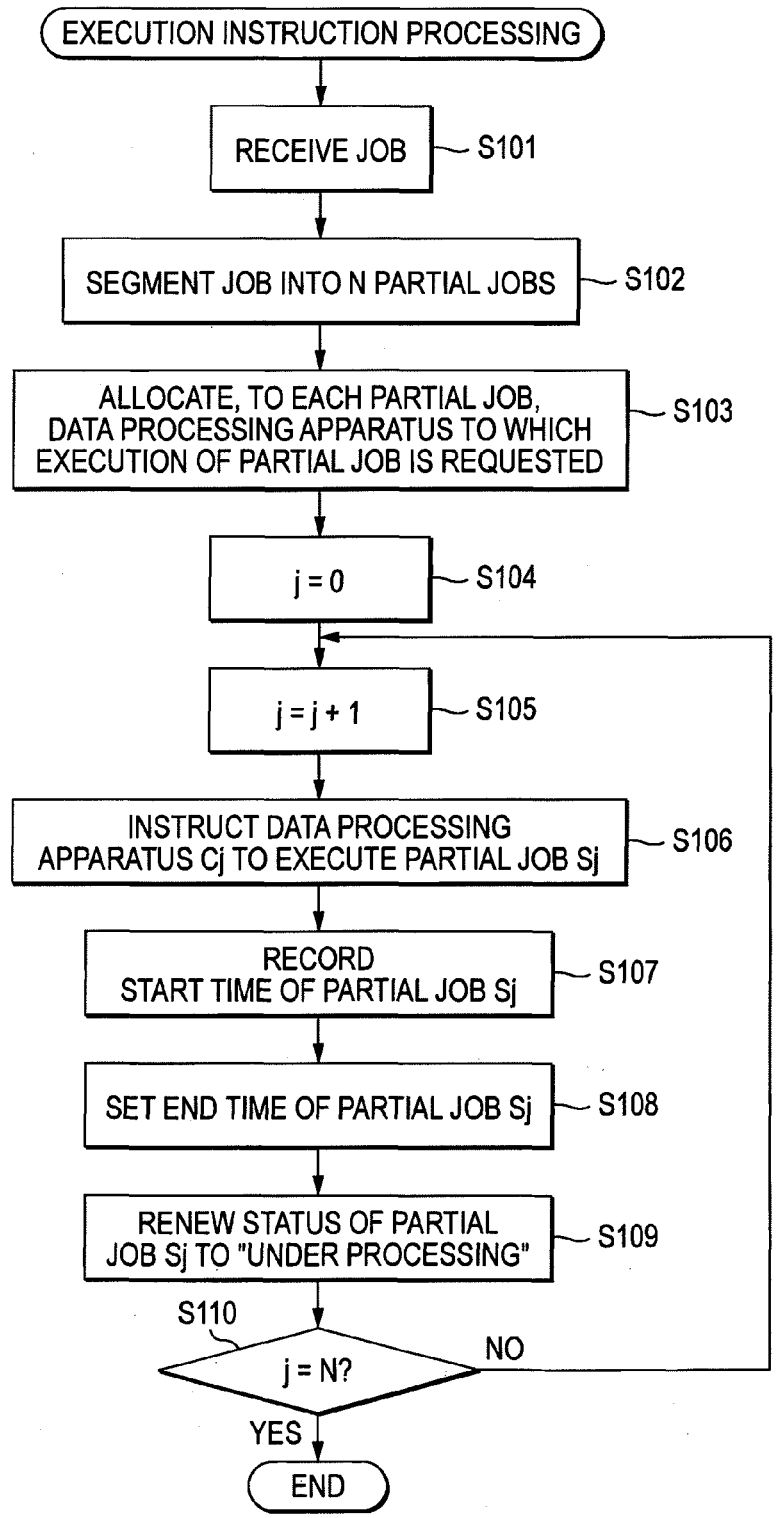
FIG. 7 is a flowchart illustrating the processing of the job execution apparatus according to Embodiment 1, from the allocation of partial jobs to data processing apparatuses to the issue of execution instructions.
Figure 8:
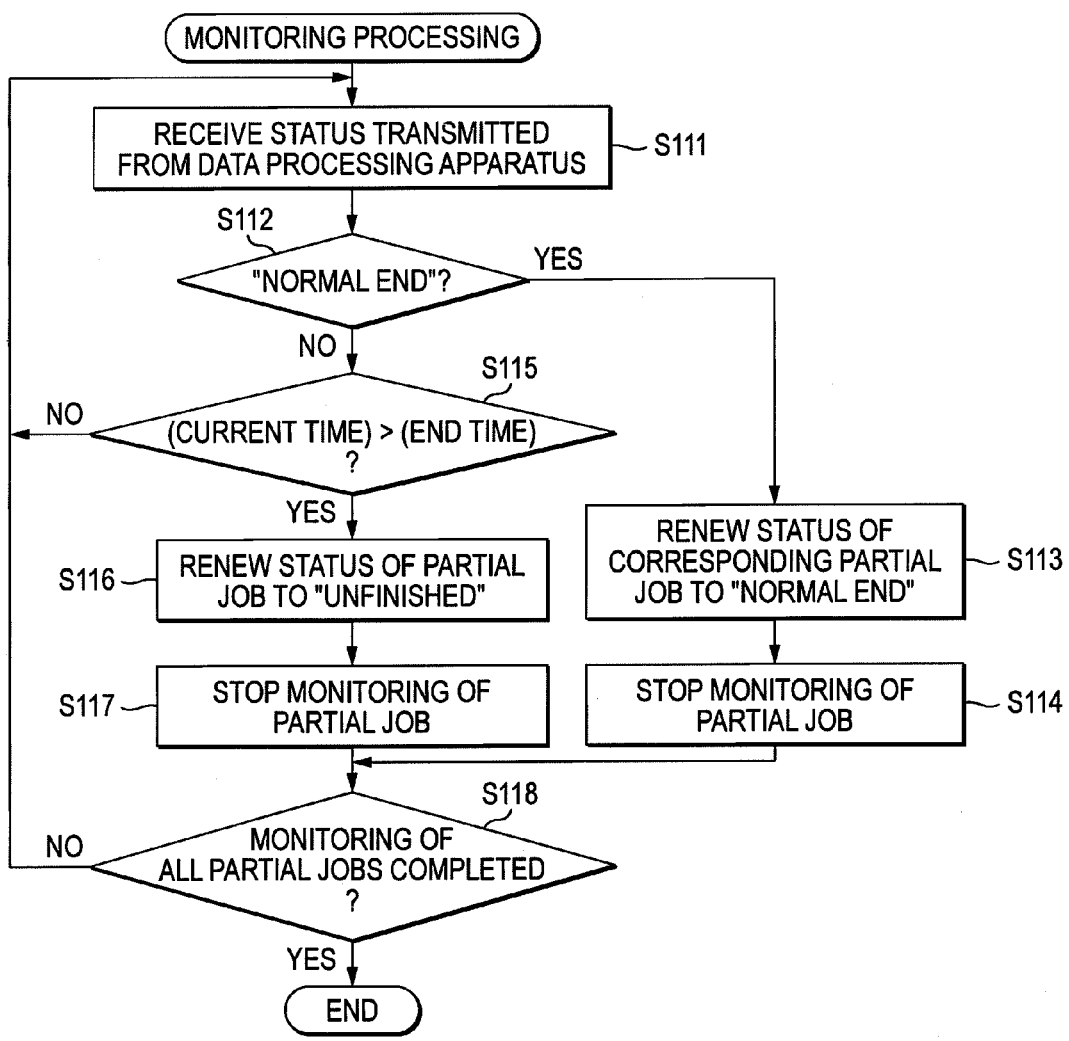
FIG. 8 is a flowchart illustrating the processing of the job execution apparatus according to Embodiment 1, for monitoring the execution of the partial jobs.
Figure 9:
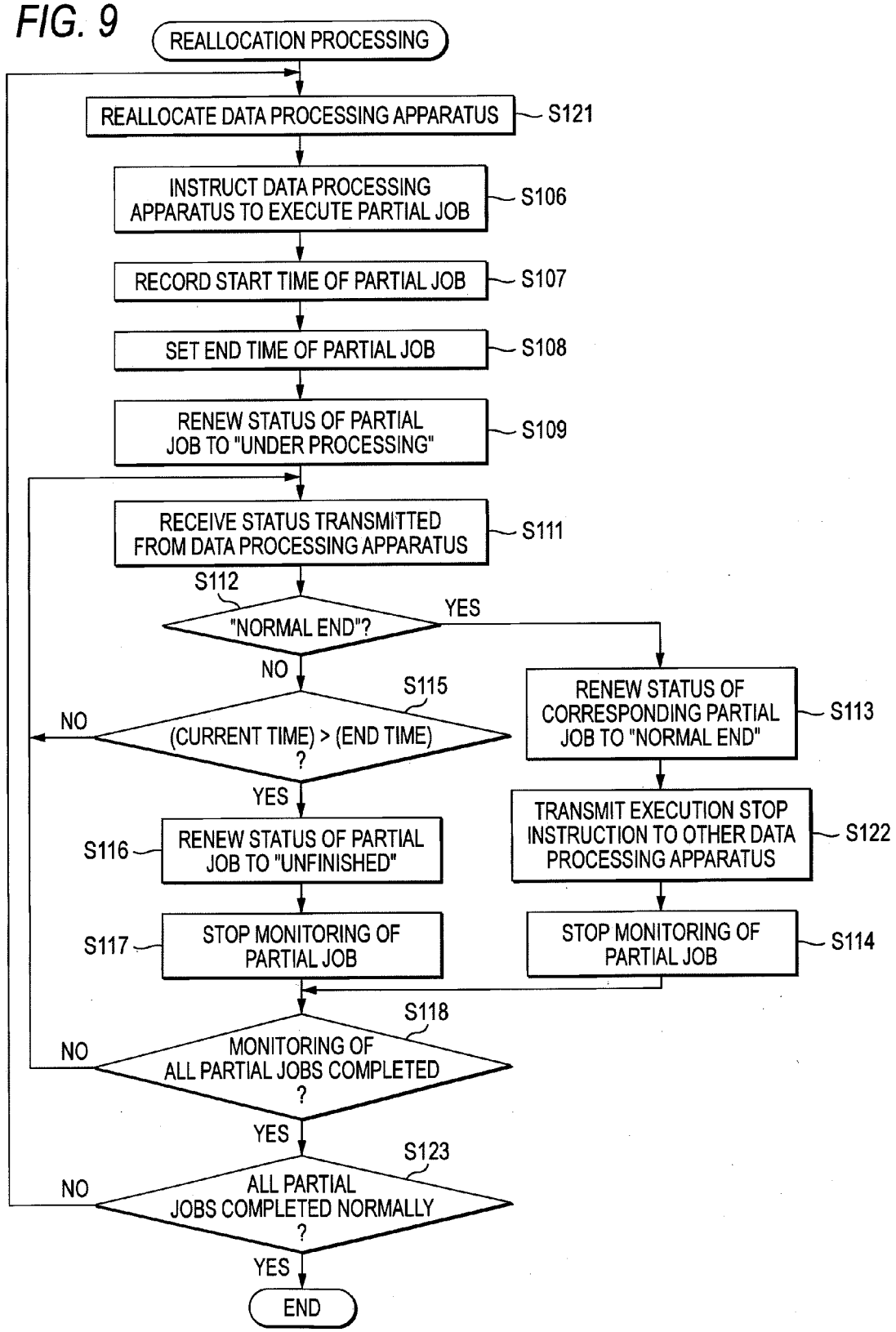
FIG. 9 is a flowchart illustrating the processing of the job execution apparatus according to Embodiment 1, for reallocating unfinished partial jobs to the data processing apparatuses, for issuing execution instructions and for monitoring the execution of the partial jobs.

FIG. 7 is a flowchart illustrating the processing of the job execution apparatus 10 according to this embodiment, from the allocation of partial jobs to the data processing apparatuses 40 to the issue of execution instructions. FIG. 8 is a flowchart illustrating the processing of the job execution apparatus 10 according to this embodiment, for monitoring the execution of the partial jobs. FIG. 9 is a flowchart illustrating the processing of the job execution apparatus 10 according to this embodiment, for reallocating unfinished partial jobs to the data processing apparatuses 40, for issuing execution instructions and for monitoring the execution of the partial jobs. The operations according to this embodiment will be described below referring to these flowcharts.

Referring to FIG. 7, when the job receiving section 22 of the job execution apparatus 10 receives a job requested for execution from the PC 2, for example (at step 101), the job segmentation processing section 23 segments the job into N (N is a natural number of 2 or more) partial jobs (at step 102).

When the segmentation is judged to be unnecessary, only the job execution section 25 of the job execution apparatus 10 executes the received job.

When a plurality of partial jobs are formed by the segmentation of the job, the partial job allocation processing section 24 allocates, to each partial job, a data processing apparatus 40 to which the execution of the partial job is requested, by recognizing the function required for the execution of the partial job through analysis and by verifying the required function against the executable functions and the specialty function contained in the apparatus function information stored in the apparatus function information storage section 31 (at step 103). The partial job allocation processing section 24 registers the URL of the allocated data processing apparatus 40 in "location" of the allocation information stored in the allocation information storage section 32 and registers the function to be executed by the data processing apparatus 40 in "requested function" of the allocation information stored in the allocation information storage section 32 for each partial job. At this time, the start time and the end time are set at NULL, and "before start" is set as the initial value of the status. In the case that the job execution apparatus 10 has the function required for the execution of a partial job among the partial jobs generated by the segmentation of the job, the partial job is basically executed by the job execution apparatus 10, and the other partial jobs are executed instead by the data processing apparatuses 40. However, even if the job execution apparatus 10 has the function required for the execution of the partial job, in the case that it is judged that the execution of the partial job can be done more efficiently when the execution is requested to a data processing apparatus 40 than when the execution is done by the job execution apparatus 10, in view of load reduction, processing time reduction, etc. of the apparatus, the execution of the partial job may be requested to the data processing apparatus 40.

When the data processing apparatuses Cj requested to execute the partial jobs are allocated to all the partial jobs Sj ($1 \leq j \leq N$), the partial job execution instruction section 26 transmits an execution request containing, for example, information for specifying partial job data and the job execution apparatus 10 serving as a request source, thereby sequentially instructing the data processing apparatuses Cj to execute the partial jobs Sj (at steps 104, 105 and 106). When it is detected that the partial job execution instruction section 26 has transmitted the execution request, the time monitoring section 27 records the time when the execution was instructed as "start time" of the allocation information stored in the allocation information storage section 32 (at step 107). Furthermore, the time monitoring section 27 sets the limit time obtained by adding a preset allowable waiting time to the start time obtained from the content set in "start time" as "end time" of the allocation information stored in the allocation information storage section 32 (at step 108). A value preset in correspondence with the function to be used for the execution of the partial job may be used as the allowable waiting time. Alternatively, the allowable waiting time may be calculated in consideration of the function to be used for the execution and the performance of the data processing apparatus 40 serving as an execution request destination. Moreover, a delay time calculated by periodically monitoring the transmission speed of the network may be added. Alternatively, a uniform allowable waiting time P1 may be set regardless of the type of the partial job. Furthermore, when the execution of the partial job Sj starts, the time monitoring section 27 renews the "status" of the partial job Sj to "under processing" (at step 109).

The execution instruction processing for this series of partial jobs is repeated sequentially for the partial jobs ranging from the partial job S1 to the partial job SN (at step 110).

After or when the execution instructions for all the partial jobs are issued as described above, the time monitoring section 27 starts the monitoring of execution of the partial jobs. The monitoring processing will be described below referring to the flowchart shown in FIG. 8.

The time monitoring section 27 waits for a message from any one of the data processing apparatuses 40 via the communication processing section 21 and the execution result receiving section 28. When a message is transmitted from any one of the data processing apparatuses 40, the time monitoring section 27 receives the message (at step 111). In the case that the received message is "normal end" indicating the completion of the execution of the partial job (Y at step 112), the time monitoring section 27 judges that the partial job executed by the data processing apparatus 40 has been completed normally and renews "status" of the allocation information stored in the allocation information storage section 32 corresponding to the partial job to "normal end" (at step 113). Then, the time monitoring section 27 stops monitoring by excluding the partial job from the monitoring target of the execution status (at step 114).

On the other hand, in the case that the received message is not "normal end" (N at step 112), the time monitoring section 27 judges whether the current time has passed the end time that is set for the partial job being executed by the data processing apparatus 40 serving as the message transmission source. In the case that the current time has not passed the end time (N at step 115), the processing returns to step 111, and the time monitoring section 27 waits for the input of the next message. In addition to the message indicating "normal end" described above, a hardware failure notice, a notice indicating that the partial job is not executable owing to the inoperability of the designated function or other reasons, etc. are regarded as the types of messages to be transmitted from the data processing apparatuses 40. Even in the case that no message is transmitted, the time monitoring section 27 may periodically monitor the current time and judge whether the current time has passed the end time.

In the case that the current time has passed the end time (Y at step 115), the partial job to which the end time was set is specified as an unfinished partial job, the time monitoring section 27 renews the "status" of the allocation information stored in the allocation information storage section 32 corresponding to the partial job to "unfinished" (at step 116). Then, the time monitoring section 27 stops monitoring by excluding the partial job from the monitoring target of the execution status (at step 117).

Next, in the case that the monitoring of all the partial jobs has not been completed (N at step 118), the processing returns to step 111, and the time monitoring section 27 continues the monitoring of the remaining partial jobs. In the case that the monitoring of all the partial jobs has been completed (Y at step 118), the time monitoring section 27 stops its monitoring operation.

By virtue of the above-mentioned processing, "status" of each partial job in the allocation information is renewed from "under processing" to "normal end" or "unfinished."

An operation to be executed in the case that a partial job, "status" of which is set to "unfinished" by the above-mentioned processing, exists will be described below referring to the flowchart shown in FIG. 9. Since the processing shown in FIG. 9 is a combination of the processing steps described referring to FIGS. 7 and 8, processing steps similar to those shown in FIGS. 7 and 8 are designated by the same reference codes, and their descriptions are omitted as necessary.

After the monitoring processing described referring to FIG. 8 has been completed, in the case that even one partial job, "status" of which is set to "unfinished," exists in the allocation information as the result of the monitoring processing by referring to the allocation information stored in the allocation information storage section 32, the execution of the unfinished partial job is required to be performed again and completed normally so that the execution of the job containing the partial job can be completed.

Hence, the partial job allocation processing section 24 according to this embodiment executes again the processing for allocating the unfinished partial job to any one of the data processing apparatuses 40 by referring to the apparatus function information stored in the apparatus function information storage section 31 (at step 121). The reallocation processing of the data processing apparatuses 40 for the unfinished job will be described below in detail referring to FIG. 10.

Figure 10:
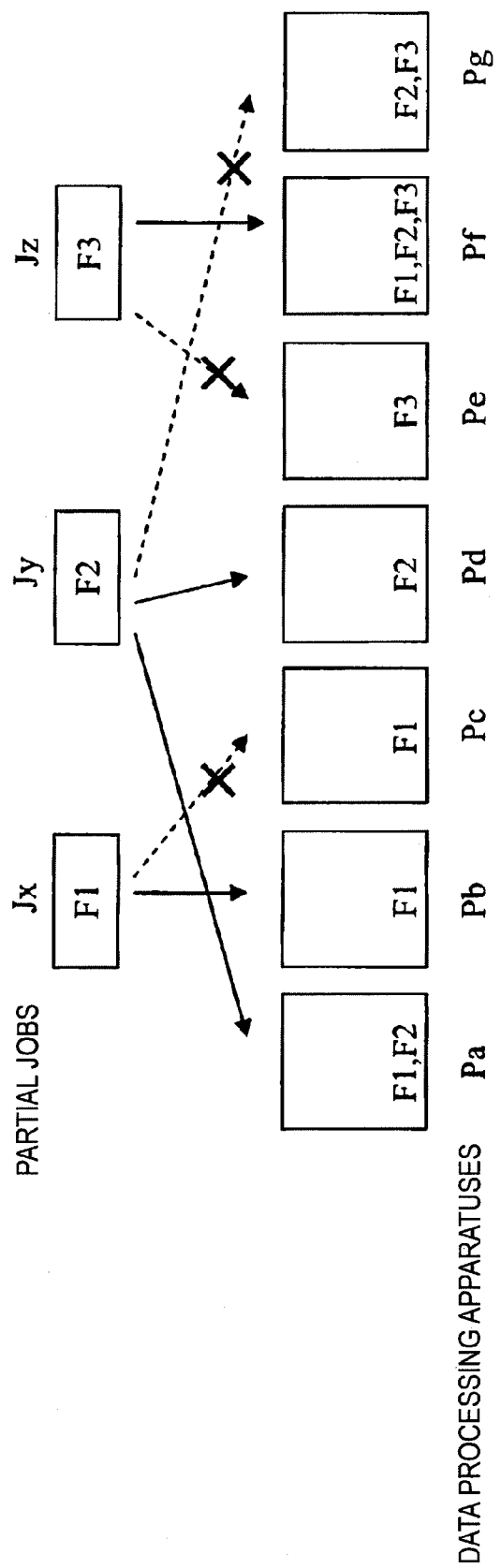
FIG. 10 is a view illustrating reallocation processing performed in Embodiment 1.

FIG. 10 shows unfinished partial jobs Jx, Jy and Jz and data processing apparatuses Pa to Pg. F1 to F3 designate functions. According to FIG. 10, F1 and F2 are mounted on the data processing apparatus Pa, F1 is mounted on the data processing apparatus Pb, F1 is mounted on the data processing apparatus Pc, F2 is mounted on the data processing apparatus Pd, F3 is mounted on the data processing apparatus Pe, F1, F2 and F3 are mounted on the data processing apparatus Pf, and F2 and F3 are mounted on the data processing apparatus Pg. In the first allocation processing, as indicated by arrows drawn in broken lines in FIG. 10, the data processing apparatus Pc was allocated to the partial job Jx, the data processing apparatus Pg was allocated to the partial job Jy, and the data processing apparatus Pe was allocated to the partial job Jz. However, FIG. 10 shows that the execution of the partial jobs was unable to be completed until the end times in all the data processing apparatuses Pc, Pg and Pe. In this state, the partial job allocation processing section 24 executes again the reallocation processing as described below referring to the apparatus function information.

First, it is desired that the data processing apparatuses Pc, Pg and Pe in which the execution of the partial jobs Jx, Jy and Jz was unable to be completed until the end times should be excluded from candidates to which all the unfinished partial jobs Jx, Jy and Jz are allocated. It is predictable that these data processing apparatuses PC, Pg and Pe are operating under high load states because the apparatuses have already received job execution requests from other job execution apparatuses 10 or that the data processing apparatuses are inoperative owing to failure of hardware, trouble of software, etc. Hence, it is assumed to be highly possible that even if the execution of the partial jobs is requested again to the data processing apparatuses, the partial jobs cannot be completed until the end time.

After the data processing apparatuses PC, Pg and Pe are excluded from the available candidates, data processing apparatuses respectively capable of executing the partial jobs Jx, Jy and Jz are attempted to be selected. First, the execution of the partial job Jx can be requested to the data processing apparatuses Pa, Pb and Pf on which the function F1 is mounted. The execution of the partial job Jy can be requested to the data processing apparatuses Pa, Pd and Pf on which the function F2 is mounted. The execution of the partial job Jz can be requested to only the data processing apparatus Pf on which the function F3 is mounted. In other words, since the execution of the partial job Jz can be requested to only the data processing apparatus Pf in this situation, the data processing apparatus Pf is preferentially allocated to the partial job Jz.

Next, for example, in the case that the partial job Jy is required to be executed more preferentially than the partial job Jx, all the data processing apparatuses capable of executing the partial job Jy, that is, Pa and Pd, are preferentially allocated to the partial job Jy on the premise that a data processing apparatus that can be allocated to the partial job Jx remains available. A plurality of data processing apparatuses may be selected from among all the data processing apparatuses capable of executing the partial job, instead of selecting all the data processing apparatuses. Furthermore, the data processing apparatus Pb that is not allocated to the partial jobs Jy and Jz and can execute the function F1 is allocated to the partial job jx.

FIG. 11 shows a data setting example of apparatus function information obtained as the result of the reallocation processing. Data is set in the items of job ID, requested function, apparatus ID and execution instruction destination in FIG. 11 at this time. As understood by referring to FIG. 11, a plurality of execution destinations are designated to the partial job Jy. Furthermore, "apparatus ID" not contained in the allocation information shown in FIG. 6 is contained in FIG. 11 so that the correspondence relationship between each partial job and the data processing apparatus allocated thereto can be visually recognized easily.

In this embodiment, the data processing apparatuses are allocated to unfinished partial jobs, for example, according to predetermined conditions that the data processing apparatuses that generated unfinished partial jobs should be excluded from the candidates of the data processing apparatuses for the reallocation and that partial job allocation should not be overlapped. Furthermore, for example, it may be possible to use reallocation conditions that data processing apparatuses having high performance should be allocated preferentially and that data processing apparatuses featuring a short execution result transmission time should be allocated preferentially. In this embodiment, although a plurality of execution destinations are designated to the partial job Jy, it may be possible that only one data processing apparatus is selected as a reallocation destination according to the above-mentioned predetermined conditions, for example, and the data processing apparatus is allocated to the unfinished job.

In this embodiment, the data processing apparatuses that generated unfinished partial jobs are excluded from the candidates and the reallocation of the remaining data processing apparatuses is carried out. The reason for the reallocation is as described above. However, it is assumed that the reason why the data processing apparatuses that generated the unfinished partial jobs were allocated to the partial jobs in the first allocation processing is because not only the data processing apparatuses have functions required for the execution of the partial jobs, but also the data processing apparatuses have functions required for the execution of the partial jobs as specialty functions or the data processing apparatuses are superior to the other data processing apparatuses in some respects, such as performance, transmission cost and billing cost. Moreover, the reason why the execution of the partial jobs is unfinished is because when the execution of the partial jobs are instructed, the data processing apparatuses are executing other jobs and are in a high load state temporarily. Hence, even if the data processing apparatuses generated the unfinished partial jobs, it may be worth trying to carry out the execution of the partial jobs again in the same data processing apparatuses. Consequently, at the time of the reallocation, it may be possible that execution requests are issued once again to the data processing apparatuses that generated the unfinished partial jobs, in addition to the data processing apparatuses selected as the reallocation destinations according to the procedure described above.

Furthermore, in the case that the execution result receiving section 28 receives, during the above-mentioned reallocation processing, a message indicating "normal end" from a data processing apparatus 40 to which an unfinished partial job was allocated, the execution result obtained together with this message "normal end" may be used at the time of job integration. In other words, although the execution of the partial job is judged "unfinished" because of the expiration of the end time, this corresponds to a case in which the data processing apparatus 40 transmitted the execution result after the expiration of the end time. In this case, although "normal end" was not attained within the end time, since the use of the execution result obtained as the result of the normal end is more efficient than the use of the execution result obtained newly after the execution of the partial job is requested again, the corresponding partial job may be excluded from the target of the reallocation.

Returning to FIG. 9, when the data processing apparatus 40 for executing again the unfinished partial job is specified at step 121 as described above, the partial job execution instruction section 26 instructs the data processing apparatus 40 to execute the partial job by transmitting an execution request thereto (at step 106). After detecting that the partial job execution instruction section 26 has transmitted the execution request, the time monitoring section 27 records the time when the execution was instructed in "start time" of the allocation information stored in the allocation information storage section 32 (at step 107), and sets an end time in "end time" (at step 108). Then, when the execution of the unfinished partial job is started, the time monitoring section 27 renews the "status" of the unfinished partial job to "under processing" (at step 109). Although FIG. 9 does not show that this processing is executed repeatedly, the processing for this execution instruction is carried out repeatedly for the respective partial jobs as in the case of FIG. 7.

Then, the partial job execution monitoring processing (at steps 111 to 118) of the time monitoring section 27 is started. Since this processing is similar to that shown in FIG. 8, its destination is omitted. However, in the case of the reallocation, there is a case in which a plurality of data processing apparatuses 40 are designated as the execution instruction destinations of an unfinished partial job. Hence, in the case that the execution result receiving section 28 receives the message "normal end" (Y at step 112), the time monitoring section 27 renews the "status" of the allocation information stored in the allocation information storage section 32 corresponding to the partial job to "normal end" (at step 113), and the time monitoring section 27 instructs the data processing apparatuses 40 to which the execution of the partial job was instructed to stop the execution of the partial job via the partial job execution instruction section 26 and the communication processing section 21 (at step 122). Then, the time monitoring section 27 excludes the partial job from the monitoring target of the execution status and completes the monitoring (at step 114).

The above-mentioned monitoring processing (steps 111 to 118) are repeated until the monitoring of all the partial jobs is completed. By this processing, the "status" of each partial job in the allocation information is renewed from "under processing" to "normal end" or "unfinished."

After the monitoring of all the partial jobs has been completed (Y at step 118), the time monitoring section 27 confirms whether all the partial jobs have been completed normally by referring to the "status" of each partial job in the allocation information. In the case that all the partial jobs have been completed normally (Y at step 123), the reallocation processing is completed. In the case that even one unfinished partial job exists (N at step 123), the reallocation of the data processing apparatus 40 to such unfinished partial jobs is carried out repeatedly.

When it is confirmed that all the partial jobs have been completed normally, the job integration processing section 29 obtains the execution results of the respective partial jobs that were received by the execution result receiving section 28 at the time of the completion of the partial jobs. Furthermore, in the case that a partial job is also executed by the job execution apparatus 10, the job integration processing section 29 also obtains the execution result of the partial job. Then, the job integration processing section 29 integrates these execution results to restore the execution result of the job. Then, the job integration processing section 29 returns the execution result of the job generated by the restoration to the PC 2 used as a job execution request source via the communication processing section 21.

In this embodiment, an example is described in which the job execution apparatus 10 executes a job using the data processing apparatuses 40 contained in the cloud 4. However, the present invention is not necessarily limited to a system configuration that uses the cloud 4. For example, it may be possible to use a configuration in which a plurality of computers are connected to the network 6, any one of the computers is used as the job execution apparatus 10, and the other computers are used as the data processing apparatuses 40. Furthermore, since the job execution apparatus 10 has processing functions required for job execution, the job execution apparatus 10 may also function as the data processing apparatus 40 so as to serve for another job execution apparatus. Moreover, the data processing apparatus 40 may be provided with the configuration of the job execution apparatus 10 so as to serve as the job execution apparatus 10. In other words, in this embodiment, the computers are classified into a computer serving as the job execution apparatus 10 to which the execution of a job is requested and computers serving as the data processing apparatuses 40 to which the execution of partial jobs are requested, for the convenience of description. However, a computer connected to the network 6 may also be configured as a data processing apparatus having both the function of the job execution apparatus 10 and the function of the data processing apparatus 40. In other words, in the case that each computer is provided with the functions of both the apparatuses, the computer operates as the job execution apparatus 10 when a job is received and operates as the data processing apparatus 40 in the other cases. This modified example of the system is also applicable to an embodiment described below.

Embodiment 2

In Embodiment 1 described above, the job execution apparatus 10 is provided with the function for managing the information of the data processing apparatuses 40 and the function for monitoring the execution statuses of partial jobs. However, Embodiment 2 is characterized in that a system configuration is provided in which a job execution management apparatus is provided separately so that these functions are executed by the job execution management apparatus.

Figure 12:
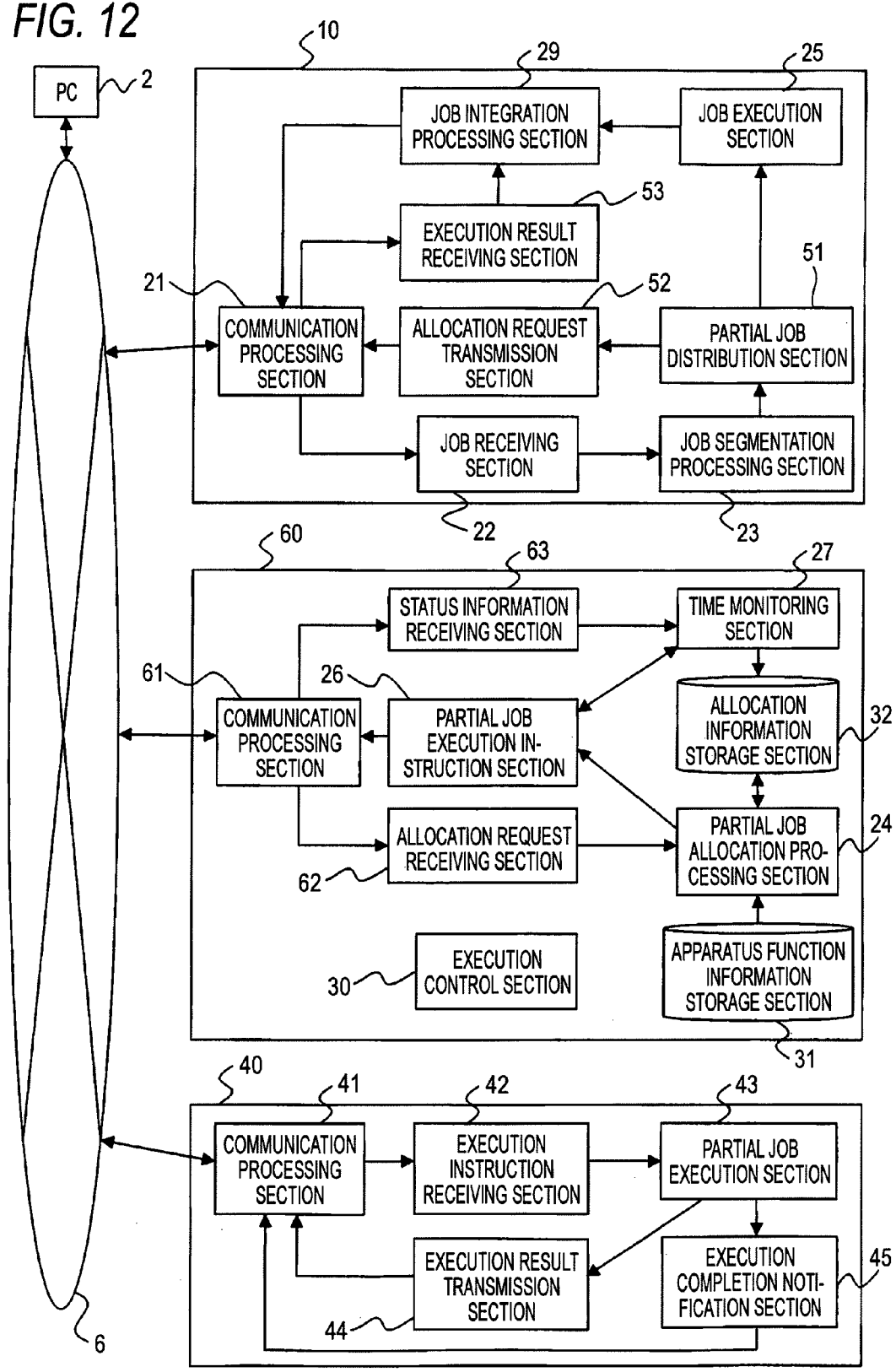
FIG. 12 is a block configuration diagram showing a job execution system according to Embodiment 2.

FIG. 12 is a block configuration diagram showing a job execution system according to this embodiment. The job execution system according to this embodiment has a configuration in which, in addition to the job execution apparatus 10 and the data processing apparatuses 40, a job execution management apparatus 60 is connected to the network 6. For the sake of convenience, only one data processing apparatus 40 is shown. Among the components shown in FIG. 12, the same components as those according to Embodiment 1 are designated by the same reference codes, and their descriptions are omitted as necessary.

In Embodiment 1 described above, the job execution apparatus 10 is provided with the function for allocating partial jobs to the data processing apparatuses 40, the function for monitoring the execution statuses of the partial jobs, the function for managing the information of the data processing apparatuses 40, etc. However, Embodiment 2 is characterized in that a system configuration is provided in which components for accomplishing these functions are disposed in the job execution management apparatus 60 that is newly provided, and the job execution management apparatus 60 uniformly carry out partial job allocation processing and reallocation processing inside the system. The job execution management apparatus 60 may be accomplished by the hardware configuration of the general-purpose computer shown in FIG. 3.

The job execution apparatus 10 has the communication processing section 21, the job receiving section 22, the job segmentation processing section 23, and the job execution section 25 as in the case of Embodiment 1, and also has a partial job distribution section 51, an allocation request transmission section 52, and an execution result receiving section 53. The partial job distribution section 51 distributes partial jobs formed by segmenting a job using the job segmentation processing section 23 to a partial job to be executed by the job execution section 25 of the job execution apparatus 10 itself and to partial jobs, the execution of which is requested to the data processing apparatuses 40. As described in Embodiment 1, for example, a condition as to whether functions are mounted or not on the job execution apparatus 10 itself may be used as a distribution condition. The allocation request transmission section 52 transmits, to the job execution management apparatus 60, an allocation request for allocating any one of the data processing apparatuses 40 to a partial job that is selected by the partial job distribution section 51 so that the execution of the partial job is requested to the data processing apparatus 40. The execution result receiving section 53 receives the execution result of the partial job transmitted from the data processing apparatus 40 as in the case of Embodiment 1. However, Embodiment 2 differs from Embodiment 1 in that the execution result receiving section 53 does not receive messages, such as "normal end."

The components 21 to 23, 25 and 51 to 53 of the job execution apparatus 10 are accomplished by the cooperation between the computer constituting the job execution apparatus 10 and programs operating on the CPU 11 mounted on the computer. Furthermore, the apparatus function information storage section 31 and the allocation information storage section 32 may be accomplished by the HDD 14.

The job execution management apparatus 60 has the partial job allocation processing section 24, the partial job execution instruction section 26, the time monitoring section 27, the execution control section 30, the apparatus function information storage section 31, and the allocation information storage section 32, these being described in Embodiment 1. Furthermore, the job execution management apparatus 60 has a communication processing section 61, an allocation request receiving section 62, and a status information receiving section 63. The communication processing section 61 has a function basically equivalent to that of the communication processing section 21 and performs communication between the job execution apparatus 10 and the data processing apparatuses 40. Furthermore, the communication processing section 61 distributes received data to the allocation request receiving section 62 or the status information receiving section 63 depending on the contents of the data. The allocation request receiving section 62 receives and accepts an allocation request transmitted from the job execution apparatus 10. The status information receiving section 63 receives, for example, status information indicating the message "normal end" transmitted from each data processing apparatus 40 when the execution of a partial job has been completed, as a function of the execution result receiving section 28 according to Embodiment 1. Notices regarding hardware failure, etc. are taken as examples of the other status information, as described in Embodiment 1.

The components 24, 26, 27, 30 and 61 to 63 of the job execution management apparatus 60 are accomplished by the cooperation between the computer constituting the job execution management apparatus 60 and programs operating on the CPU 11 mounted on the computer. Furthermore, the apparatus function information storage section 31 and the allocation information storage section 32 may be accomplished by the HDD 14.

The data processing apparatus 40 has a communication processing section 41, an execution instruction receiving section 42, a partial job execution section 43, an execution result transmission section 44, and an execution completion notification section 45. The communication processing section 41 performs communication between the job execution apparatus 10 and the data processing apparatuses 40 and receives a partial job execution instruction and real data transmitted from the job execution management apparatus 60. The execution instruction receiving section 42 receives the execution instruction from the job execution management apparatus 60. The partial job execution section 43 executes the partial job that is designated by the execution instruction. The execution result transmission section 44 transmits the execution result of the partial job executed by the partial job execution section 43 to the job execution apparatus 10. The execution completion notification section 45 transmits status information indicating that the execution of the partial job by the partial job execution section 43 has been completed normally to the job execution management apparatus 60.

The components 41 to 45 of the data processing apparatus 40 are accomplished by the cooperation between the computer constituting the data processing apparatus 40 and programs operating on the CPU 11 mounted on the computer.

Next, the operation according to this embodiment will be described below. Since the flow of the basic processing according to this embodiment is the same as that according to Embodiment 1 described referring to FIGS. 7 to 9, its description is omitted as necessary. Since the apparatus function information, the allocation information and the allocation processing function provided for the job execution apparatus 10 in Embodiment 1 are transferred to the job execution management apparatus 60 in Embodiment 2, information to be transmitted between the apparatuses in Embodiment 2 is slightly different from that in Embodiment 1.

More specifically, in the job execution apparatus 10, when the job receiving section 22 receives a request for executing a job from the PC 2, for example, the job segmentation processing section 23 segments the job into N partial jobs. The partial job distribution section 51 distributes the segmented partial jobs into a partial job to be executed by the job execution apparatus 10 itself and partial jobs to be executed by the data processing apparatuses 40. The allocation request transmission section 52 transmits an allocation request containing information for specifying the job execution apparatus 10 itself and partial jobs to be executed by the corresponding data processing apparatuses 40 to the job execution management apparatus 60 via the communication processing section 21.

In the job execution management apparatus 60, when the allocation request receiving section 62 receives the allocation request transmitted from the job execution apparatus 10 via the communication processing section 61, the partial job allocation processing section 24 allocates the data processing apparatuses 40 to respective partial jobs, the execution of which is requested, according to the procedure described in Embodiment 1. Then, the partial job execution instruction section 26 transmits a request for instructing the execution of each partial job to the corresponding data processing apparatus 40. This execution instruction request contains the real data of the partial job to be executed, contained in the allocation request from the job execution apparatus 10, and information for specifying the job execution apparatus 10, such as a URL, serving as the transmission destination of the execution result of the partial job and an execution completion notice. Then, the processing in the job execution management apparatus 60 is shifted to the processing shown in FIG. 8, and the job execution management apparatus 60 waits for the transmission of a status from each data processing apparatus 40.

In the data processing apparatus 40, when the execution instruction receiving section 42 receives the request for instructing the execution of the partial job transmitted from the job execution management apparatus 60 via the communication processing section 41, the partial job execution section 43 executes the received partial job. When the execution of the partial job is completed, the execution result transmission section 44 transmits the execution result of the partial job to the job execution apparatus 10 specified by the transmission destination designated by the execution instruction request. The execution result transmission section 44 may indirectly transmit the execution result of the partial job to the job execution apparatus 10 via the job execution management apparatus 60. However, in this embodiment, the execution result transmission section 44 directly transmits the execution result as described above in consideration of processing efficiency. On the other hand, the execution completion notification section 45 transmits a message indicating that the execution of the partial job has been completed normally to the job execution management apparatus 60.

In the job execution management apparatus 60, in the case that the "status" of any one of the partial jobs in the allocation information is "unfinished" as the execution result of the monitoring processing (FIG. 8) of the data processing apparatuses 40, the reallocation processing shown in FIG. 9 is executed. In the case that it is confirmed that all the partial jobs have been completed normally as the result of the reallocation processing, the job execution management apparatus 60 transmits a notice indicating normal end to the job execution apparatus 10.

When the execution result receiving section 53 confirms that the execution of all the partial jobs requested to the data processing apparatuses 40 has been completed normally according to the notice from the job execution management apparatus 60, the execution result receiving section 53 transfers the execution results of the partial jobs having already been received at this time to the job integration processing section 29. The job integration processing section 29 integrates the execution results of the respective partial jobs received by the execution result receiving section 53 and the execution result of the partial job executed by the job execution apparatus 10 in the case that the partial job was executed by the apparatus, thereby restoring the execution result of the job. Then, the job integration processing section 29 returns the execution result of the job generated by the restoration to the PC 2 used as a job execution request source via the communication processing section 21.

In this embodiment, the job execution apparatus 10 executes the received job through interaction among the job execution apparatus 10, the job execution management apparatus 60 and the data processing apparatuses 40 as described above. With this configuration, the job execution management apparatus 60 performs job execution control for the entire system. However, for example, it may also be possible to use a configuration in which the job execution management apparatus 60 is provided with means for monitoring the load states of the respective data processing apparatuses 40 and determines appropriate data processing apparatuses 40 to which partial jobs should be allocated in consideration of the load states of the respective data processing apparatuses 40, such as the number of the allocated partial jobs.

Although the real data of a partial job, the execution of which is requested to a data processing apparatus 40 is transmitted from the job execution apparatus 10 to the data processing apparatus 40 via the job execution management apparatus 60 in the above description, it may also be possible that the job execution apparatus 10 generates an allocation request containing only the information required for the allocation processing to be executed by the job execution management apparatus 60, such as the ID of each partial job and a function required for the execution of the partial job and then transmits the allocation request to the job execution management apparatus 60. In this case, the job execution management apparatus 60 returns the result of the allocation processing indicating the correspondence relationship between the partial job and the data processing apparatus 40 to the job execution apparatus 10, and the job execution apparatus 10 refers to the result of the allocation processing and transmits, to each data processing apparatus, the partial job corresponding thereto.

Furthermore, in this embodiment, although the destination to which the execution result of a partial job is transmitted is informed to the corresponding data processing apparatus 40 by containing the URL of the job execution apparatus 10 in an allocation request, it may also be possible that information in which the identification information (ID) of the job execution apparatus 10 contained inside the system is made correspondence with its URL is uniformly managed by the job execution management apparatus 60, and that the ID of the job execution apparatus 10 is contained in the allocation request that is transmitted to the job execution management apparatus 60.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A job execution management apparatus comprising:
   a receiving unit that receives an allocation request for allocating a plurality of partial jobs formed by segmenting a job to a plurality of data processing apparatuses;
   a storage unit that stores apparatus function information in which functions executable by the respective data processing apparatuses are defined;

an allocation unit that allocates the respective plurality of partial jobs to the data processing apparatuses which are capable of executing the plurality of partial jobs by referring to the apparatus function information according to the allocation request;

a setting unit that sets so that, when a partial job is allocated to one of the data processing apparatuses, information for specifying the data processing apparatus allocated to the partial job, start time information for specifying the time when the execution of the partial job is started and end time information for specifying the end time of the execution of the partial job are made correspondence with the partial job;

an execution instruction unit that instructs the execution of a partial job to the corresponding data processing apparatus according to the setting of the setting unit; and a reallocation unit, after the instruction from the execution instruction unit, (i) that specifies partial jobs among the partial jobs which are instructed to be executed, the execution of the specified partial jobs being not finished until the times specified by the end time information corresponding to the partial jobs, and (ii) that reallocates at least one of the data processing apparatuses which is capable of executing the unfinished partial jobs, excluding the data processing apparatuses to which the unfinished partial jobs are allocated by the allocation unit, to each of the specified unfinished partial jobs by referring to the apparatus function information, wherein the execution instruction unit instructs the data processing apparatuses reallocated by the reallocation unit to execute the unfinished partial jobs.

2. The job execution management apparatus according to claim 1, wherein the reallocation unit reallocates the unfinished partial jobs to the data processing apparatuses to which the unfinished partial jobs are allocated by the allocation unit.

3. The job execution management apparatus according to claim 1, wherein in the case that the number of the data processing apparatuses which are capable of executing the unfinished partial job is plural, the reallocation unit selects one of the data processing apparatuses based on a preset selection standard and reallocates the unfinished partial job to the selected data processing apparatus.

4. The job execution management apparatus according to claim 1, wherein the reallocation unit reallocates the unfinished partial job to the plurality of data processing apparatuses capable of executing the unfinished partial job.

5. The job execution management apparatus according to claim 4, further comprising:

a stop instruction unit, in the case that the reallocation unit reallocated the unfinished partial job to the plurality of data processing apparatuses and in the case that a notice indicating an normal end of the unfinished partial job was issued from one of the plurality of data processing apparatuses, the stop instruction unit that instructs a stop of the execution of the unfinished partial job to the data processing apparatuses other than the data processing apparatus which issues the notice among the plurality of data processing apparatuses to which the unfinished partial job was reallocated.

6. A job execution apparatus comprising:

a receiving unit that receives a request for executing a job;
a forming unit that segments a received job into a plurality of partial jobs;

a storage unit that stores apparatus function information in which functions executable by the respective data processing apparatuses are defined;

an allocation unit that allocates the respective plurality of partial jobs to the data processing apparatuses which are capable of executing the plurality of partial jobs by referring to the apparatus function information;

a setting unit that sets so that, when a partial job is allocated to one of the data processing apparatuses, information for specifying the data processing apparatus allocated to the partial job, start time information for specifying the time when the execution of the partial job is started and end time information for specifying the end time of the execution of the partial job are made correspondence with the partial job;

a execution instruction unit that instructs the execution of a partial job, to which the data processing apparatus is allocated, to the corresponding data processing apparatus according to the setting of the setting unit; and a reallocation unit, after the instruction from the execution instruction unit, (i) that specifies partial jobs among the partial jobs which are instructed to be executed, the execution of the specified partial jobs being not finished until the times specified by the end time information corresponding to the partial jobs, and (ii) that reallocates at least one of the data processing apparatuses which is capable of executing the unfinished partial jobs, excluding the data processing apparatuses to which the unfinished partial jobs are allocated by the allocation unit, to each of the specified unfinished partial jobs by referring to the apparatus function information, wherein the execution instruction unit instructs the data processing apparatuses reallocated by the reallocation unit to execute the unfinished partial jobs.

7. A job execution system comprising:

a job execution apparatus that executes all or part of a plurality of partial jobs formed by segmenting a received job;

a job execution management apparatus that manages an execution of the job; and a plurality of data processing apparatuses that executes one or more partial jobs instead of the job execution apparatus, wherein the job execution apparatus includes:

an execution request receiving unit that receives a request for executing a job;

a forming unit that segments a received job into a plurality of partial jobs;

an allocation request transmission unit that transmits an allocation request for allocating the execution of the partial job to any one of the data processing apparatuses to the job execution management apparatus; and a returning unit that generates an execution result of the job according to an execution results of the plurality of partial jobs and returns the execution result to the execution request source of the job, the job execution management apparatus includes:

an allocation request receiving unit that receives the allocation request transmitted from the job execution apparatus;

a storage unit stores apparatus function information in which functions executable by the respective data processing apparatuses are defined;

an allocation unit that allocates the respective plurality of partial jobs to the data processing apparatuses which are capable of executing the plurality of partial jobs by referring to the apparatus function information according to the allocation request;

a setting unit that sets so that, when a partial job is allocated to one of the data processing apparatuses, information for specifying the data processing apparatus allocated to the partial job, start time information for specifying the time when the execution of the partial job is started and end time information for specifying the end time of the execution of the partial job are made correspondence with the partial job;

an execution instruction unit that instructs the execution of a partial job to the corresponding data processing apparatus according to the setting of the setting unit;

a receiving unit that receives a notice indicating the end of the execution of the partial job from the data processing apparatus; and a reallocation unit, after the instruction from the execution instruction unit, (i) that specifies partial jobs among the partial jobs which are instructed to be executed, the execution of specified partial jobs being not finished until the times specified by the end time information corresponding to the partial jobs, and (ii) that reallocates at least one of the data processing apparatuses which is capable of executing the unfinished partial jobs, excluding the data processing apparatuses to which the unfinished partial jobs are allocated by the allocation unit, to each of the specified unfinished partial jobs by referring to the apparatus function information, wherein the execution instruction unit instructs the data processing apparatuses reallocated by the reallocation unit to execute the unfinished partial jobs, and the data processing apparatus includes:

an executing unit that executes the allocated partial job according to the execution instruction from the job execution management apparatus;

an end notice transmission unit that transmits a notice indicating the end of the execution of a partial job when the execution of the partial job is finished; and an execution result transmission unit that transmits the execution result of the partial job to the job execution apparatus directly or indirectly.

8. A non-transitory computer-readable medium storing a program that causes a computer to execute job execution management, the job execution management comprising:

receiving an allocation request for allocating a plurality of partial jobs formed by segmenting a job to a plurality of data processing apparatuses;

allocating the respective plurality of partial jobs to the data processing apparatuses which are capable of executing the plurality of partial jobs by referring to the apparatus function information according to the allocation request, the apparatus function information defining functions executable by the respective data processing apparatuses;

setting so that, when a partial job is allocated to one of the data processing apparatuses, information for specifying the data processing apparatus allocated to the partial job, start time information for specifying the time when the execution of the partial job is started and end time information for specifying the end time of the execution of the partial job are made correspondence with the partial job;

instructing the execution of a partial job to the corresponding data processing apparatus according to the setting; and specifying partial jobs among the partial jobs which are instructed to be executed after the instruction, the execution of the specified partial jobs being not finished until the times specified by the end time information corresponding to the partial jobs;

reallocating at least one of the data processing apparatuses which is capable of executing the unfinished partial jobs, excluding the data processing apparatuses to which the unfinished partial jobs are allocated, to each of the specified unfinished partial jobs by referring to the apparatus function information; and instructing the reallocated data processing apparatuses to execute the unfinished partial jobs.

* * * * *